United States Patent
Knerr et al.

(10) Patent No.: US 9,528,003 B2
(45) Date of Patent: Dec. 27, 2016

(54) ACID MODIFIED NATURAL FILLER TO INITIALIZE THE BETA-NUCLEATION OF POLYPROPYLENE

(75) Inventors: Michael Knerr, Oftringen (CH); Matthias Buri, Rothrist (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 984 days.

(21) Appl. No.: 13/509,129

(22) PCT Filed: Nov. 9, 2010

(86) PCT No.: PCT/EP2010/067097
§ 371 (c)(1),
(2), (4) Date: Jun. 5, 2012

(87) PCT Pub. No.: WO2011/061094
PCT Pub. Date: May 26, 2011

(65) Prior Publication Data
US 2012/0264866 A1    Oct. 18, 2012

(30) Foreign Application Priority Data

Nov. 19, 2009 (EP) .................................. 09176445

(51) Int. Cl.
| | | |
|---|---|---|
| *C09C 1/02* | (2006.01) | |
| *C08K 3/26* | (2006.01) | |
| *C08K 5/053* | (2006.01) | |
| *C08K 5/098* | (2006.01) | |
| *C08L 33/08* | (2006.01) | |

(52) U.S. Cl.
CPC ................ *C09C 1/021* (2013.01); *C08K 3/26* (2013.01); *C08K 5/053* (2013.01); *C08K 5/098* (2013.01); *C08L 33/08* (2013.01); *C01P 2002/88* (2013.01); *C01P 2004/51* (2013.01); *C01P 2004/61* (2013.01); *C01P 2004/62* (2013.01); *C01P 2006/12* (2013.01); *Y10T 428/2991* (2015.01)

(58) Field of Classification Search
CPC  C09C 1/021; Y10T 428/2991; C01P 2004/51; C01P 2004/62; C01P 2004/61; C01P 2006/12; C01P 2002/88; C08K 3/26; C08K 5/053; C08K 5/098; C08L 33/08
USPC ........................................................ 524/425
See application file for complete search history.

(56) References Cited

U.S. PATENT DOCUMENTS 6,402,824 B1 * 6/2002 Freeman ............... B01F 3/1207
                                                        106/464
8,074,909 B2 * 12/2011 Gane et al. ..................... 241/21

FOREIGN PATENT DOCUMENTS

| AT | WO 2008074494 A1 * | 6/2008 | ........... C07C 51/412 |
| EP | 1 746 128 A1 | 1/2007 | |
| WO | 2007/138410 A1 | 12/2007 | |

OTHER PUBLICATIONS

The International Search Report, dated Apr. 11, 2011 for PCT Application No. PCT/EP2010/067097.
The Written Opinion of the International Searching Authority for PCT Application No. PCT/EP2010/067097.

* cited by examiner

*Primary Examiner* — Angela C Scott
(74) *Attorney, Agent, or Firm* — Amster, Rothstein & Ebenstein LLP

(57) ABSTRACT

The present invention relates to a composition for beta-nucleation of polypropylene, comprising: (a) a particulate mineral solid support, comprising a compound of a IUPAC Group 2 metal, and (b) on the surface of the particulate solid support (b1) a salt of a dicarboxylic acid, wherein the dicarboxylic acid has from 7 to 10 carbon atoms, and (b2) a dispersing and/or grinding agent.

16 Claims, No Drawings

ACID MODIFIED NATURAL FILLER TO INITIALIZE THE BETA-NUCLEATION OF POLYPROPYLENE

CROSS-REFERENCE TO RELATED APPLICATIONS

This application is U.S. National phase of PCT Application No. PCT/EP2010/067097, filed Nov. 9, 2010, which claims priority to European Application No. 09176445.6, filed Nov. 19, 2009.

The present invention relates to a composition for beta-nucleation of polypropylene, and a process for the preparation of the composition.

Typically, when cooling down a polypropylene melt, it crystallizes in the monoclinic alpha-modification. In addition to this alpha-modification, polypropylene, however, may also crystallize in the hexagonal beta-modification and the orthorhombic gamma-modification. The beta-modification is characterized by improved mechanical properties, in particular improved impact strength and improved resistance to stress cracking.

Crystallization in the beta-modification is achieved by adding specific beta-nucleating agents, such as quinacridone pigments, which are disclosed in EP 0 177 961 A2. A further well-known class of beta-nucleating agents are IUPAC Group 2 salts of dibasic organic acids.

U.S. Pat. No. 5,231,126 discloses that beta-nucleation can be achieved by the admixing of isotactic polypropylene with a two-component beta-nucleating agent consisting of a mixture of a dibasic acid with an oxide, hydroxide or acid salt of a IUPAC Group 2 metal. Suitable examples of dibasic acids are pimelic acid, azelaic acid, o-phthalic acid, terephthalic acid and isophthalic acid, and the like. Suitable oxides, hydroxides or acid salts of IUPAC Group 2 metals are compounds comprising magnesium, calcium, strontium or barium, in particular calcium carbonate or other carbonates.

A drawback of the two-component beta-nucleating agent disclosed in this prior art, however, is the insufficient reproducibility of the effect achieved, since the melt mixing of the two-component beta-nucleating agent with the polypropylene may lead to varying results, due to the influence of parameters such as melt temperature, shear conditions, compounding time etc.

Efforts accordingly have been made to prepare more reliable systems for achieving beta-nucleation, based on dibasic organic acids and IUPAC Group 2 metal compounds.

EP 0 682 066 A1 discloses such an attempt for achieving a more reliable modification. This document describes that improvements can be achieved by employing a one-component beta-nucleating agent, produced by reacting 1 mole of dicarboxylic acid with 1 mole calcium carbonate in an aqueous ethanol-containing solution at 60 to 80° C. This reaction yields the calcium salt of the dicarboxylic acid which is obtained in the form of a fine precipitate which can be isolated by filtration. Thereafter, the product is dried and may be used as a beta-nucleating agent.

The drawback of this one-component beta-nucleating agent, namely the calcium salt of the dicarboxylic acid is, on the one hand, the presence of 1 mole of crystal water in the obtained precipitate which decreases the effect of beta-nucleation. The removal of this crystal water is only achievable under severe conditions which, however, increases the cost of the additive, since additional heating steps are required. A further drawback is the fact that the one-component beta-nucleating agent is obtained in the form of a fine precipitate, which gives rise to problems during filtration. In particular, fine precipitates are a major drawback when considering the scale up of the synthesis, since fine precipitates will lead to a drastic decrease of filtration efficiency.

W. L. Cheung et al., *Journal of Vinyl & Additive Technology*, June 1997, Vol. 3, pp. 151-156, disclose the use of sodium pimelate and calcium pimelate as a beta-nucleating agent for polypropylene.

J. Varga et al., *Journal of Applied Polymer Science*, Vol. 74, 1999, pp. 2357-2368, disclose the use of calcium salts of suberic acid and pimelic acid as a beta-nucleating agent for polypropylene.

X. Li et al., *Journal of Applied Polymer Science*, Vol. 86, 2002, pp. 633-638, disclose the use of a number of different calcium dicarboxylates as a beta-nucleating agent for polypropylene.

It furthermore has to be taken into account that dibasic organic acids are rather expensive raw materials, so that it would be advantageous to reduce the amount of dibasic organic acid required for -nucleation.

It is also known to provide salts of dicarboxylic acids on a solid support.

EP 1 939 167 A1 discloses a beta-nucleating agent for polypropylene, wherein a surface layer of a dicarboxylate salt such as calcium pimelate is provided on the surface of a IUPAC Group 2 metal compound support such as calcium carbonate. The beta-nucleating agent is obtained by heat treatment and solid state reaction between the particulate solid support and the dicarboxylic acid in the absence of solvents or other liquid reaction media. After the solid state reaction, the beta-nucleating agent can be subjected to further post treatment steps such as a milling treatment.

EP 1 746 128 A1 discloses a heterophasic polypropylene comprising a mineral filler and a beta-nucleating agent. The mineral filler can be coated with the beta-nucleating agent.

Although beta-nucleated polypropylene possesses high impact strength and toughness, yield stress and stiffness are lower than those of non-nucleated or alpha-nucleated polypropylene. To improve stiffness of beta-nucleated polypropylene, it is known to add specific nano-sized inorganic fillers ("nano-fillers").

K. Mai et al., *European Polymer Journal*, 44 (2008), pp. 1955-1961, disclose a beta-nucleating agent which has been prepared by reacting pimelic acid with nano-sized calcium carbonate having a particle diameter between 40 and 60 nm. A very similar process is described by K. Mai et al. in *Polymer*, 49 (2008), pp. 5137-5145.

However, the preparation of nano-sized beta-nucleating agents might require additional grinding steps, thereby impairing energy efficiency of the preparation process. Furthermore, if prepared by a precipitation process, it is sometimes difficult to fine-tune all process parameters such that an average particle size in the low nanometer-range is obtained.

Considering the statements provided above, it is an object of the present invention to provide a composition which is an efficient beta-nucleating agent even at low amounts, is obtainable by a simple and energy-efficient process, but still maintains stiffness of the beta-nucleated polypropylene on a high level.

According to a first aspect of the present invention, the object is solved by providing a composition for beta-nucleation of polypropylene, comprising
(a) a particulate mineral solid support, comprising a compound of a IUPAC Group 2 metal, and
(b) on the surface of the particulate mineral solid support (b1) a salt of a dicarboxylic acid, wherein the dicarboxylic acid has from 7 to 10 carbon atoms, and (b2) a dispersing and/or grinding agent.

As will be described below in further detail, the dispersing and/or grinding agent can be adsorbed on the surface of the particulate solid support during a grinding and/or dispersing step. It has been realized in the present invention that, although a part of the surface of the solid support is already blocked or occupied by the dispersing and/or grinding agent, the remaining part of the surface is still accessible to the dicarboxylic acid salt, and both components provided together on the surface of the solid support result in an efficient beta-nucleating agent even at low amounts, still maintaining stiffness of the beta-nucleated polypropylene on a high level.

The term "mineral" relates to any naturally occurring solid.

Preferably, the IUPAC Group 2 metal of the particulate solid support is selected from Mg, Ca, Sr or a mixture thereof.

As will be described in further detail below, the composition of the present invention for beta-nucleation of polypropylene is preferably prepared by reacting the particulate mineral solid support with the dicarboxylic acid so as to provide the corresponding salt of the dicarboxylic acid on the surface of the solid support. Thus, it is preferred that the compound of the IUPAC Group 2 metal being present in the particulate solid support has at least some reactivity towards the dicarboxylic acid, even in the presence of a grinding and/or dispersing agent, which is preferably water-soluble, so as to provide the dicarboxylic acid salt on its surface. Preferably the present grinding and/or dispersing agent even improves the reactivity between the dicarboxylic acid and the IUPAC Group 2 metal compound by improved spreading and wetting the surface of the support.

Preferably, the compound of the IUPAC Group 2 metal is selected from a carbonate, hydroxide, oxide, oxyhydroxide, or any mixture thereof.

Preferably, the compound of the IUPAC Group 2 metal is selected from calcium carbonate, calcium-magnesium carbonate and/or magnesium carbonate, magnesium hydroxide, or any mixture thereof.

In a preferred embodiment, the calcium carbonate is natural ground calcium carbonate (GCC). When using GCC (CAS 1317-65-3), carbon footprint of the product can be improved.

Preferably, the natural ground calcium carbonate GCC is selected from marble, limestone, chalk, or mixtures thereof, and preferably contains at least 95 wt %, more preferably more than 98 wt % calcium carbonate. GCC is well-known to the skilled person and is commercially available, e.g. from Omya.

The natural calcium-magnesium carbonate mineral can be e.g. dolomite.

A preferred magnesium hydroxide mineral is e.g. brucite.

Preferred magnesium carbonate minerals are e.g. selected from magnesite, barringtonite, nesquehonite, lansfordite, or any combination thereof. It is also possible to use basic forms of magnesium carbonate such as artinite, hydromagnesite, dypingite, or combinations thereof.

It is preferred that the particulate mineral solid support comprises the compound of the IUPAC Group 2 metal, such as calcium carbonate, magnesium hydroxide, calcium-magnesium carbonate, and/or magnesium carbonate, in an amount of at least 50 wt %, more preferably at least 70 wt %, even more preferably at least 90 wt %. It is also possible that the particulate mineral solid support consists of the compound of the IUPAC Group 2 metal.

Preferably, the particulate solid support has a medium particle size $d_{50}$ of from 0.5 μm to 7 μm, more preferably from 0.7 μm to 5 μm, even more preferably from 0.8 μm to 2 μm, for example 1.5 μm. Further preferably the top cut, expressed as $d_{98}$, is <10 μm, more preferably <7 μm, and/or the specific surface (BET) is between 1 and 5 $m^2/g$, more preferably 2.0 to 4.5 $m^2/g$. Very preferably the top cut ($d_{98}$) is <7 μm, the medium particle size $d_{50}$ is from 1 to 2 μm and the specific surface area is from 2.5 to 4.0 $m^2/g$.

In particular, if the medium particle size is small, such as 5 μm or less, or even 2 μm or less, optical transparency of the polypropylene material to which the beta-nucleating composition of the present invention is added, can be improved as light scattering effects are largely suppressed due to the small particle size.

Preferably, the particulate mineral solid support has a specific surface area of from 1 $m^2/g$ to 5 $m^2/g$, more preferably from 2.0 $m^2/g$ to 4.5 $m^2/g$, measured using nitrogen and the BET method according to ISO 9277.

As defined above, the composition of the present invention comprises on the surface of the particulate solid support a salt of a dicarboxylic acid, wherein the dicarboxylic acid has from 7 to 10 carbon atoms.

Preferably, the salt of the dicarboxlic acid is a IUPAC Group 2 metal salt, more preferably a salt selected from a calcium salt, a magnesium salt, a strontium salt, or a mixture thereof.

In a preferred embodiment, the IUPAC Group 2 metal of the salt of the dicarboxlic acid corresponds to the IUPAC Group 2 metal of the particulate solid support. As an example, if the particulate mineral solid support comprises calcium carbonate, it is preferred that a calcium salt of the dicarboxylic acid, e.g. calcium pimelate, is provided on the surface of the solid support but can also be different, if a blend of different particulate solid supports or dolomite is in use.

Preferably, the dicarboxylic acid is selected from pimelic acid, suberic acid, azelaic acid, phthalic acid, isophthalic acid, terephthalic acid, or any mixture thereof.

Preferably, the salt of the dicarboxylic acid is present in an amount of 0.05 wt % to 10 wt %, more preferably 0.1 to 5 wt %, even more preferably 0.25 to 2 wt %, based on the weight of the particulate solid support. Preferably, the salt of the dicarboxylic acid is present in an amount of 0.15 $mg/m^2$ of the solid support to 30 $mg/m^2$ of the solid support, more preferably 0.75 $mg/m^2$ to 6 $mg/m^2$ of the solid support, for example 2 to 4 $mg/m^2$ of the solid support.

In the present invention, it is not necessary that all dicarboxylic acid molecules brought into contact with the surface of the mineral solid support undergo a chemical reaction to the corresponding salt. Thus, the particulate mineral solid support may additionally comprise on its surface free dicarboxylic acid molecules. The molar ratio of the salt of the dicarboxylic acid to the corresponding free dicarboxylic acid can be at least 1:2, more preferably at least 1:1, even more preferably at least 4:1, even further preferably at least 9:1.

The term "free dicarboxylic acid" refers to a dicarboxylic acid which is still protonated, i.e. which has not formed a salt. Thus, the molar ratio of the salt of the dicarboxylic acid to the corresponding free dicarboxylic acid indicates to which degree the dicarboxylic acid has reacted with the compound of the IUPAC Group 2 metal of the solid support.

As defined above, the composition of the present invention comprises on the surface of the particulate mineral solid support a dispersing and/or grinding agent.

In general, dispersing and/or grinding agents which can be used in a grinding process of inorganic materials such as mineral fillers are known to the skilled person. Such dispersing and/or grinding agents support the grinding of inorganic particles by reducing the viscosity of the slurry and thereby increasing the mobility and free path length of the particles to be ground and the grinding beads. As these dispersing and/or grinding agents adsorb on the surface of the freshly ground particles, they also prevent or at least significantly reduce re-agglomeration.

Preferably, the dispersing and/or grinding agent is water-soluble.

In the context of the present invention, the grinding and/or dispersing agent can be selected from an agent for wet grinding, an agent for dry grinding, or a mixture of these.

It is commonly known to the skilled person that there are two general types of grinding processes for inorganic particles such as mineral fillers, i.e. a wet grinding process (i.e. grinding carried out in a liquid grinding medium) and a dry grinding process. Furthermore, the skilled person knows that there are preferred dispersing and/or grinding agents for each of these grinding methods.

In a preferred embodiment of the present invention, the dispersing and/or grinding agent being present on the surface of the particulate solid support is selected from a homo- or copolymer of a carboxylic acid or carboxylic acid salt (i.e. a homo- or copolymer having monomer units derived from a carboxylic acid or a salt thereof), such as a homo- and co-polyacrylate; glycols; polyglycols; polyalkylene glycols; sugars such as sucrose and/or sorbitol; alkanolamines; or mixtures thereof.

The homo- or copolymers of the carboxylic acid or carboxylic acid salt are preferably based on monomer units derived from acrylic acid, methacrylic acid, maleic acid, fumaric acid or itaconic acid, acryl amide or mixtures thereof. Homopolymers or copolymers of acrylic acid such as those available from BASF, Ludwigshafen, Allied Colloids, Great Britain or COATEX, France are especially preferred. The weight average molecular weight Mw of such products is preferably in the range of 200 to 15000; an Mw of 3000 to 7000 is especially preferred. Polydispersity is preferred between 1.2 and 5, more preferred between 2.0 and 3.5.

The polymers and/or copolymers may be neutralized with monovalent and/or polyvalent cations or they may have free acid groups. Suitable monovalent cations include for example sodium, lithium, potassium and/or ammonium. Preferred polyvalent cations include for example divalent cations such as calcium, magnesium, strontium or trivalent cations such as aluminium. Dispersing and/or grinding agents such as sodium polyphosphates or sodium citrate may also be used, either alone or in combination with others.

Especially in dry grinding, the dispersing and/or grinding agents can be selected from the group comprising glycols, polyglycols, polyalkylene glycols, sugars such as sucrose and/or sorbitol, or alkanolamines, e.g., triethanolamine, 2-amino-2-methyl-1-propanol (AMP), or any mixture thereof.

Preferably, the dispersing and/or grinding agent is present in an amount of 0.01 wt % to 2 wt %, more preferably 0.05 to 1.0 wt %, based on the weight of the particulate solid support. For dry grinding, a preferred amount can be from 0.05 wt % to 0.5 wt %, based on the weight of the particulate solid support. For wet grinding, a preferred amount can be from 0.1 wt % to 1.0 wt %, based on the weight of the particulate solid support.

As will be described below in further detail when discussing the process of the present invention, it is preferred that the dicarboxylic acid which reacts with the particulate mineral solid support is added during final grinding.

Preferably, the composition of the present invention has a medium particle size $d_{50}$ of from 0.5 µm to 7 µm, more preferably from 0.7 µm to 5 µm, even more preferably from 0.8 µm to 2 µm, for example 1.5 µm. Further preferably the top cut, expressed as $d_{98}$, is <10 µm, more preferably <7 µm, and/or the specific surface (BET) is between 1 and 5 $m^2/g$, more preferably 2.0 to 4.5 $m^2/g$. Very preferably the top cut ($d_{98}$) is <7 µm, the medium particle size $d_{50}$ is from 1 to 2 µm and the specific surface area is from 2.5 to 4.0 $m^2/g$.

In particular, if the medium particle size of the composition is small, such as 5 µm or less, or even 2 µm or less, optical transparency of the polypropylene material to which the composition of the present invention is added, can be improved as light scattering effects are largely suppressed due to the small particle size.

Preferably, the composition of the present invention has a specific surface area of from 1 $m^2/g$ to 5 $m^2/g$, more preferably from 2.0 $m^2/g$ to 4.5 $m^2/g$, measured using nitrogen and the BET method according to ISO 9277.

According to a further aspect, the present invention provides a process for the preparation of the composition for beta-nucleation of polypropylene as described above, comprising the following steps:
 (i) providing a particulate mineral solid support which comprises a compound of a IUPAC Group 2 metal,
 (ii) grinding the particulate mineral solid support in the presence of a dispersing and/or grinding agent, and
 (iii) bringing the particulate mineral solid support into contact with a dicarboxylic acid having from 7 to 10 carbon atoms, wherein step (iii) is carried out during or after step (ii).

The particulate solid support provided in step (i) may comprise quite coarse particles, as these are subsequently ground to the desired finer medium particle size in the grinding step (ii). As an example, the particulate solid support provided in step (i) can have a $d_{95}$ diameter of 30 mm or less, or 5 mm or less. The particulate solid support provided in step (i) may have a medium particle size $d_{50}$ of from 0.2 mm to 0.7 mm. However, these are just exemplary ranges. The particle size of the mineral solid support provided in step (i) is not critical as long as the grinding step (ii) is not adversely affected.

With regard to other properties of the particulate mineral solid support, reference is made is the disclosure provided above.

Furthermore, with regard to the compound of a IUPAC Group 2 metal, reference is made to the disclosure provided above when discussing the composition of the present invention.

As defined above, the process of the present invention comprises a grinding step (ii) wherein the particulate mineral solid support is ground in the presence of a dispersing and/or grinding agent In a preferred embodiment, the particulate mineral solid support is ground to a medium particle size $d_{50}$ of from 0.5 µm to 7 µm, more preferably from 0.7 µm to 5 µm, even more preferably from 0.8 µm to 2 µm, for example 1.5 µm. Further preferably the top cut, expressed as $d_{98}$, is <10 µm, more preferably <7 µm, and/or the specific surface (BET) is between 1 and 5 $m^2/g$, more preferably 2.0 to 4.5 $m^2/g$. Very preferably the top cut ($d_{98}$) is <7 μm, the medium particle size $d_{50}$ is from 1 to 2 μm and the specific surface area is from 2.5 to 4.0 m$^2$/g.

It is commonly known to the skilled person that there are two general types of grinding processes for inorganic particles such as mineral fillers, i.e. a wet grinding and a dry grinding process. Furthermore, the skilled person knows that there are preferred dispersing and/or grinding agents for each of these grinding methods.

Preferably, the amount of the dispersing and/or grinding agent used in step (ii) is from 0.01 wt % to 2 wt %, more preferably 0.05 to 1.0 wt %, based on the weight of the particulate solid support. Even more preferably, the amount is from 0.05 wt % to 0.5 wt % for dry grinding, and/or from 0.1 wt % to 1.0 wt % for wet grinding, based on the weight of the particulate solid support.

Step (ii) may comprises at least one wet grinding step and/or at least one dry grinding step.

Both dry and wet grinding steps may be performed one after the other. If step (ii) comprises at least one wet grinding step as well as at least one dry grinding step, it is preferred that the last one is a wet grinding step.

Preferably, the dispersing and/or grinding agent of the wet grinding step is a homo- or copolymer of a carboxylic acid or carboxylic acid salt (i.e. a homo- or copolymer having monomer units derived from a carboxylic acid or carboxylic acid salt). As an example, polyacrylates (either as a homopolymer or a copolymer containing additional monomers) can be mentioned.

The homo- or copolymers of the carboxylic acid or carboxylic acid salt are preferably based on monomer units derived from acrylic acid, methacrylic acid, maleic acid, fumaric acid or itaconic acid, acryl amide or mixtures thereof. Homopolymers or copolymers of acrylic acid such as those available from BASF, Ludwigshafen, Allied Colloids, Great Britain or COATEX, France are especially preferred. The weight average molecular weight Mw of such products is preferably in the range of 200 to 15000; an Mw of 3000 to 7000 is especially preferred. Polydispersity is preferred between 1.2 and 5, more preferred between 2.0 and 3.5. The polymers and/or copolymers may be neutralized with monovalent and/or polyvalent cations or they may have free acid groups. Suitable monovalent cations include for example sodium, lithium, potassium and/or ammonium. Preferred polyvalent cations include for example divalent cations such as calcium, magnesium, strontium or trivalent cations such as aluminium. Dispersing and/or grinding agents such as sodium polyphosphates or sodium citrate may also be used, either alone or in combination with others.

Preferably, the wet grinding step is carried out in an aqueous medium. In a preferred embodiment, the solids content of the aqueous medium in the wet grinding step is from 10 wt % to 85 wt %, more preferably from 60 wt % to 82 wt %, even more preferably from 65 wt % to 78 wt %.

If a wet grinding step is used, the process further comprises a step for removal of the liquid, preferably aqueous grinding medium. This can be accomplished by conventional methods such as a heating step, a spray drying step, or combinations thereof.

If step (ii) comprises a dry grinding step, the dispersing and/or grinding agent of said dry grinding step is preferably selected from glycols such as ethylene glycol, diethylene glycol, mono propylene glycol, polyglycols, polyalkylene glycols, sugars such as sucrose and/or sorbitol, or alkanolamines, e.g., triethanolamine, 2-amino-2-methyl-1-propanol (AMP), or any mixture thereof.

A preferred dispersing and/or grinding agent for the dry grinding step is e.g. a polyalkylene glycol wherein preferably at least 90 mol %, more preferably at least 95 mol % of all monomer units are derived from ethylene oxide and/or propylene oxide. The weight average molecular weight Mw is preferably within the range of 400 to 9500 g/mole, more preferably 600 to 3000 g/mole.

If step (ii) is a dry grinding step, it is preferred that less than 10 wt %, more preferably less than 2 wt %, even more preferably less than 0.5 wt % of water are present during said dry grinding step, based on the combined weight of the particulate mineral solid support and the dispersing and/or grinding agent and, if already present during step (ii), the dicarboxylic acid.

With regard to appropriate conditions for a dry grinding step, in particular when a polyalkylene glycol is used as a dispersing and/or grinding agent, reference can be made to WO 2007/138410 A1.

For the grinding step (ii) of the process of the present invention, conventional grinding devices which are commonly known to the skilled person, can be used. Preferably, the grinding step (ii) is carried out in one or more grinding devices selected from a ball mill, a jet plate mill, a roll mill, an attritor mill, or combinations thereof.

In the case of dry grinding, preferably iron and/or porcelain beads with a diameter of 0.5 to 10 cm are used as grinding media, especially preferably iron-cylpebs with a diameter of 2.5 cm are used.

Grinding balls made of, e.g., zirconium silicate, and/or baddeleite with a diameter of 0.5 to 2 mm are preferred for wet grinding. Quartz sand having an equivalent spherical diameter of 0.1 to 2 mm may also be used.

As defined above, the process of the present invention comprises a step (iii) wherein the particulate mineral solid support is brought into contact with a dicarboxylic acid having from 7 to 10 carbon atoms, and wherein step (iii) is carried out during or after step (ii).

Preferably, "bringing into contact" means that the particulate mineral solid support is reacted with the dicarboxylic acid. The particulate mineral solid support is preferably brought into contact with the dicarboxylic acid under conditions so as to effect a chemical reaction between the surface of the solid support and the dicarboxylic acid.

If step (iii) is carried out during the grinding step (ii), this can preferably be accomplished by mixing the particulate solid support with the dispersing and/or grinding agent and the dicarboxylic acid and subsequently subjecting the mixture to the grinding step (ii).

In a preferred embodiment, step (ii) comprises a wet grinding step in an aqueous medium wherein the dispersing and/or grinding agent and the dicarboxylic acid are added to the aqueous medium prior to the grinding step, and subsequently the particulate solid is ground to the medium particle size as disclosed above.

If step (iii) is carried out after the grinding step (ii), this can preferably be accomplished by mixing the particulate solid support with the dispersing and/or grinding agent, followed by subjecting the mixture to the grinding step (ii), and subsequently reacting the ground particulate solid support with the dicarboxylic acid.

When the particulate mineral solid support is brought into contact with the dicarboxylic acid in step (iii), this can be accomplished in a liquid, preferably aqueous reaction medium, or in the absence of a liquid reaction medium.

If in step (iii) the particulate mineral solid support is brought into contact with the dicarboxylic acid in a liquid reaction medium, more preferably aqueous reaction medium, removal of said liquid reaction medium can be accomplished by commonly known standard methods. In a preferred embodiment, the liquid reaction medium is removed by spray drying, more preferably by spray drying at a temperature which results in a chemical reaction between the compound of the IUPAC group 2 metal and the dicarboxylic acid.

It can be preferred in the present invention to carry out the grinding step (ii), which can be a wet or dry grinding step, before step (iii) and the ground solid support is provided in powder form and is then mixed with the dicarboxylic acid, and the mixture is heated to a temperature high enough for initiating a chemical reaction between the compound of the IUPAC group 2 metal and the dicarboxylic acid. In this approach, no liquid reaction medium is needed.

Alternatively, the ground solid support obtained from step (ii), either in the form of a powder or a liquid suspension, preferably aqueous suspension, is brought into contact with the dicarboxylic acid in a liquid, preferably aqueous reaction medium, and the liquid reaction medium is brought to a temperature high enough for initiating a chemical reaction between the compound of the IUPAC group 2 metal and the dicarboxylic acid. If the ground solid support from step (ii) is provided in the form of a liquid suspension, said liquid suspension can be used as the liquid reaction medium. Removal of the liquid reaction medium can be accomplished by commonly known standard methods. Heating of the liquid reaction medium to an appropriate reaction temperature and removal of said liquid reaction medium can take place one after the other or simultaneously. In a preferred embodiment, the liquid reaction medium is removed by spray drying at a temperature which results in a chemical reaction between the compound of the IUPAC group 2 metal and the dicarboxylic acid.

Preferably, the ground particulate solid support is reacted with the dicarboxylic acid at a temperature above the melting temperature of the dicarboxylic acid, more preferably at a temperature of from 20° C. to 250° C., even more preferably from 80° C. to 200° C., even further preferably from 90° C. to 180° C. The reaction can be accomplished by mixing the ground particulate solid support with the dicarboxylic acid, followed by heating the blend to the desired reaction temperature.

Preferably, in the process of the present invention the reaction degree between the dicarboxylic acid and the compound of the IUPAC Group 2 metal of the solid support, defined as mole-% of the dicarboxylic acid of step (iii) which is converted to the corresponding dicarboxylic acid salt, is at least 30%, more preferably at least 50%, even more preferably at least 80%, even further preferably at least 85%.

According to a further aspect, the present invention provides the use of the composition as defined above as a beta-nucleating agent for polypropylene.

The present invention will now be described in further detail by the examples provided below.

EXAMPLES

I. Measuring Methods

1. Medium Particle Size $d_{50}$, $d_{95}$ Particle Size, and $d_{98}$ Particle Size Particle size was measured according to the sedimentation method. The sedimentation method is an analysis of sedimentation behaviour in a gravimetric field. The measurement is made with a Sedigraph™ 5100 of Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and supersonic.

2. Specific Surface Area

The specific surface area was measured using nitrogen and the BET method according to ISO 9277.

3. Amount of Dicarboxylic Acid Salt on Solid Support

The amount of dicarboxylic acid was determination by mass loss between 105° C. to 400° C. in TGA. Subtraction of blind value from grinding agent.

4. Amount of Dispersing and/or Grinding Agent on Solid Support

The amount was determined by GC/MS after extraction with ethanol for dry grinding agent, and PET for wet grinding agent.

PET means polyelectrolyte titration, i.e. titration of anionic dispersant by a cationic polymer to the equivalent point.

Further details about PET are provided below:

Polyelectrolyte Titration PET

Instruments Used

Memotitrator Mettler DL 55, Mettler, Switzerland

Phototrode DP 660, Mettler, Switzerland

Membrane filter with 0.2 μm mix-ester membrane filter (e.g. Millipore)

Balance (0.1 mg)

Chemicals

Potassium polyvinylsulfate, (WAKO) (SERVA Feinbiochemica Heidelberg)

Poly(N,N-dimethyl-3,5-dimethylene-piperidinium chloride) PDDPC (ACROS-Chemie Art. 17840-5000)

Phosphate buffer pH 7.00 (Riedel-de Haën)

Procedure

Principle

Dissolved cationic and anionic polymers (i.e. KPVS and PDDPC) will react after the principle of the "double transformation". Under ideal conditions the reaction takes place with equivalent charge neutralisation of cationic and anionic molecules.

The characteristics of these polymers, also to react with loads on pigment surfaces, can as well be used to determine the charge of pigments (depends on specific surface of pigment).

Measurement

For reproducible results the consumption KPVS at the back titration needs to be between 1.5 and 7 ml. Otherwise the titration must be repeated with an adapted sample weight. The slurry sample (e.g. $CaCO_3$ slurry) is weight into a titration vessel and diluted with demineralized water up to a volume of approx. 40 ml. 10.00 ml of the cationic PDDPC 0.01 M reagent is slowly dosed during 5 min. and further stirred for 20 min.

Afterwards the slurry is filtered through a 0.2 μm Membrane filter (Ø47 mm) and washed with 5 ml of demineralized water. The filtrated is used further. 5 ml of phosphate buffer pH 7 is added to the filtrate.

0.01 M KPVS solution is dosed slowly to the filtrate.

Endpoint of titration is detected by a Phototrode DP660, adjusted before to 1200-1400 mV in demineralized water, to titrate the excess of cationic reagent.

Evaluation

Charge Calculation $$Q_{atro} = \frac{((V_{PDDPC} * t_{PDA}) - V_{KPVS}) * (-1000)}{E_P * F_k} \quad [\mu Val/g]$$

$$w_{atro} = -\frac{Q_{atro}}{K_{DM} * 100} \quad [\%]$$

Calculation of the optimal sample weight:

$$E_P = \frac{60}{w_{DM} * K_{DM} * Fk}$$

Calculation of adapted sample weight for 4 ml consumption:

$$E_{4\,ml} = \frac{E_1 * 6}{(10 - V_{KPVS,1})}$$

Abbreviations $E_P$=sample weight [g]

$w_{DM}$=Dispersing agent content in [%]

$K_{DM}$=Dispersing agent constant [μVal/0.1 mg dispersing agent]

Fk=Solids content [%]

$V_{PDDPC}$=Volume PDDPC [ml]

$V_{KPVS}$=Volume KPVS [ml]

$t_{PDDPC}$=Titer PDDPC $E_{DM}$=Dispersing agent weight [mg]

Q=Charge [μVal/g]

$w_{atro}$=Dispersing agent content atro [%]

$E_1$=Sample weight of experiment to be optimised [g]

$V_{KPVS,1}$=experimental consumption KPVS [ml] of experiment to be optimised

Calibration

Reagent Preparation 0.01 M KPVS: Weigh in exactly 1.622 g KPVS.

In a 1000 ml volumetric flask give approx. 200 ml demineralized water. Rinse the KPVS quantitative into the volumetric flask. Dissolve and set to volume of 1000 ml at 20° C.

0.01 M PDDPC: In a 1000 ml volumetric flask approx. 1.6 g PDDPC 100% as 20% polymer solution is rinsed with demineralized water and filled to a volume of 1000 ml.

Titer Determination of PDDPC 0.01 M Solution

When a new batch of KPVS or PDDPC reagent has been prepared the titer of the PDDPC reagent must be measured according to the following procedure:

Into a Memotitrator vessel dose exactly 4.00 ml PDDPC reagent by means of the piston burette. Dilute up to ca. 70 ml with demineralized water and add 5 ml pH 7 buffer.

The titration program is started: Back titration with KPVS reagent and Phototrode DP 660 as sensor. If the KPVS consumption is >4.3 ml the PDDPC reagent has to be diluted and the titer determination will be repeated.

The titer is calculated from a triple estimation.

$$\text{Titer } PDDPC\, t_{PDA} = \frac{\text{Consumptio } nKPVS\;[ml]}{predosed\;PDDPC\;[ml]}$$

⇨ NOTE: The titer of KPVS is always assumed to be 1.000!

5. Flexural Modulus

Flexural modulus of polypropylene was measured according to ISO 178 by using injection moulded test specimens produced according to EN ISO 1873-2 of 80*10×4 mm³. Flexural modulus was determined at a cross-head speed of 2 mm/min.

6. Notched Impact Strength

Notched impact strength of polypropylene was measured according to ISO 179/1eA at 23° C. and −20° C. by using injection moulded test specimens produced according to EN ISO 1873-2 of 80*10×4 mm³.

7. Content of Beta-Crystalline Fraction

Two measuring methods have been used to determine the amount of the beta-crystalline phase:

a) Differential Scanning Calorimetry DSC

The content of the beta-phase was calculated as the ratio between the heat of fusion for the melting peak of the beta-phase and the total heat of fusion.

For the DSC measurements, specimen discs of about 10 mg were placed in aluminium pans and tested in a DSC apparatus in nitrogen atmosphere. The samples were heated at a rate of 10 K/min from −15° C. to 220° C., cooled with the same rate again to −15° C. and heated with the same rate to 220° C. The heat of fusion was tested in the last run.

b) k-Value According to Turner-Jones Equation

An additional calculation of the beta-phase content was done via the Turner-Jones equation as described by A. Turner-Jones et al., Makromol. Chem., 75 (1964), 134.

8. Reaction Degree of Dicarboxylic Acid to Corresponding Salt

The reaction degree (or conversion degree) was established by titration.

II. Samples Prepared

In the Examples, calcium carbonate samples differing in medium particle size $d_{50}$ were used. Type of natural calcium carbonate mineral used in the Examples:

Chalk ex. Champagne (Omey) in Examples 16 to 19,

Marble ex. Italy, Toscany, Carrara in all other Examples.

In addition to the medium particle size, the amount of dicarboxylic acid salt on the calcium carbonate surface was varied as well, i.e. 0.1 wt %, 1 wt %, and 10 wt %. As dicarboxylic acid to be reacted with the calcium carbonate samples, pimelic acid was used. Thus, it was calcium pimelate which was formed on the surface of the calcium carbonate particles.

In Examples 1-15 and 20-25, the calcium carbonate was subjected to a dry grinding process. Further details about type and amount of dispersing and/or grinding agent are provided in Tables 1a and 1c.

In Examples 16-19, the calcium carbonate was subjected to a wet grinding process. Further details about type and amount of dispersing and/or grinding agent are provided in Table 1c.

The ground calcium carbonate comprising the dispersing and/or grinding agent adsorbed on its surface was subsequently brought into contact and reacted with pimelic acid.

Two different reaction methods were used, a dry mixing method (Examples 1-8 and 11-25) and a wet method (Examples 9 and 10).

Further details about these reaction methods are provided below.

The Dry Mixing Method 1600 g of ground calcium carbonate (type of dispersing and/or grinding agent: see Tables 1a and 1c) was added to a lab mixer M3/1.5 from MTI Mischtechnik International GmbH and the mixing was activated at 1500 rpm. Thereafter the pimelic acid was added at room temperature and the mixer was heated to 130° C. The contents of the mixer were mixed at 190° C. under a stirring speed of 1500 rpm for a period of 10 minutes.

As a reference, a polypropylene sample without $CaCO_3$ additive (Ref. 1) and a polypropylene sample with a non-coated (i.e. no B-nucleation agent on the surface) $CaCO_3$ additive (Ref. 2) were prepared as well.

The obtained products were evaluated and the results are shown in the following Tables.

The "Wet" Method

A suspension of 25 wt % of ground calcium carbonate (type of dispersing and/or grinding agent: see Tables 1a and 1c) in water plus pimelic acid was spray dried on a MSD 100 dryer at an inlet temperature of 200° C. and, an exhaust temperature of 100° C.

Each sample which had been prepared as described above, was mixed with a propylene homopolymer powder (MFR2: 0.3 g/10 min.; density: 905 kg/m$^3$) and extruded at a melt temperature of 230° C.

As a reference, a polypropylene sample without $CaCO_3$ additive (Ref. 1) and a polypropylene sample with a non-coated (i.e. no calcium pimelate on the surface) $CaCO_3$ additive (Ref. 2) were prepared as well.

The obtained products were evaluated and the results are shown in the following Tables 1a, 1b, and 1c.

TABLE 1a

Properties of surface coated $CaCO_3$ samples

| Ex. No. | Grinding method | Reaction method | Amount of $CaCO_3$ in PP [wt %] | Medium Particle size of $CaCO_3$ [μm] | Amount [wt %] of calcium pimelate | Conversion degree [%] of fatty acid to fatty acid salt for surface hydrophobation | Amount [wt %] and type of grinding/dispersing agent |
|---|---|---|---|---|---|---|---|
| Ref. 1 | — | — | — | — | — | — | — |
| Ref. 2 |   |   | 0.2 | 1.8 | — |   | 2500 ppm MPG |
| Ex. 1 | Dry | Dry | 0.1 | 6 | 0.1 | 88 | 500 ppm MPG |
| Ex. 2 | Dry | Dry | 0.2 | 6 | 0.1 | 88 | 500 ppm MPG |
| Ex. 3 | Dry | Dry | 0.1 | 6 | 1 | 93 | 500 ppm MPG |
| Ex. 4 | Dry | Dry | 0.2 | 6 | 1 | 93 | 500 ppm MPG |
| Ex. 5 | Dry | Dry | 0.1 | 6 | 10 | 93 | 500 ppm MPG |
| Ex. 6 | Dry | Dry | 0.2 | 6 | 10 | 93 | 500 ppm MPG |
| Ex. 7 | Dry | Dry | 0.1 | 1.8 | 1 | 90 | 2500 ppm MPG |
| Ex. 8 | Dry | Dry | 0.2 | 1.8 | 1 | 90 | 2500 ppm MPG |
| Ex. 9 | Dry | Wet | 0.1 | 1.8 | 1 | 97 | 2500 ppm MPG |
| Ex. 10 | Dry | Wet | 0.2 | 1.8 | 1 | 97 | 2500 ppm MPG |
| Ex. 11 | Dry | Dry | 0.2 | 1.8 | 10 | 85 | 2500 ppm MPG |

TABLE 1b

Properties of polypropylene samples

| Ex. No. | Beta-phase content via DSC [%] | k-Value | Flexural modulus [MPa] | Notched impact strength, 23° C. [kJ/m²] | Notched impact strength, −20° C. [kJ/m²] |
|---|---|---|---|---|---|
| Ref. 1 | 0 | | 1421 | 8 | 1.7 |
| Ref. 2 | 0 | 0.06 | 1424 | 7.6 | 1.7 |
| Ex. 1 | 50.3 | | 1411 | 8.2 | 1.7 |
| Ex. 2 | 53.2 | | 1404 | 8.4 | 1.8 |
| Ex. 3 | 73.8 | 0.89 | 1331 | 23 | 5.1 |
| Ex. 4 | 74.6 | 0.89 | 1303 | 29.8 | 4.6 |
| Ex. 5 | 72.2 | 0.82 | 1294 | 32.8 | 5.1 |
| Ex. 6 | 70.0 | 0.78 | 1319 | 35.6 | 3.9 |
| Ex. 7 | 73.3 | 0.88 | 1296 | 25.6 | 4.4 |
| Ex. 8 | 74.0 | 0.86 | 1335 | 31.1 | 5.5 |
| Ex. 9 | 65.8 | 0.84 | 1456 | 17.2 | 4.9 |
| Ex. 10 | 69.0 | 0.85 | 1434 | 20.2 | 5.7 |
| Ex. 11 | 74.3 | | | | |

TABLE 1c

Properties of surface-coated CaCO₃ samples

| Ex. No. | Amount and type of dispersing/grinding agent | Reaction method | Amount of CaCO$_3$ in PP [wt %] | Medium Particle size of CaCO$_3$ [μm] | Amount [wt %] of calcium pimelate | Beta-phase content via DSC [%] |
|---|---|---|---|---|---|---|
| 12 | 2500 ppm MPG, dry grinding | Dry | 0.2 | 1.7 | 0 | 0.3 |
| 13 | 2500 ppm MPG, dry grinding | Dry | 0.2 | 1.7 | 0.5 | 73.1 |
| 14 | 2500 ppm MPG, dry grinding | Dry | 0.2 | 1.7 | 1 | 73.9 |
| 15 | 2500 ppm MPG, dry grinding | Dry | 0.2 | 1.7 | 3 | 71.2 |
| 16 | 3500 ppm PAANa, wet grinding | Dry | 0.2 | 1.0 | 0 | 0 |
| 17 | 3500 ppm PAANa, wet grinding | Dry | 0.2 | 1.0 | 0.5 | 71.9 |
| 18 | 3500 ppm PAANa, wet grinding | Dry | 0.2 | 1.0 | 1 | 74.6 |
| 19 | 3500 ppm PAANa, wet grinding | Dry | 0.2 | 1.0 | 3 | 72.9 |
| 20 | 1000 ppm MPG, dry grinding | Dry | 0.2 | 2.6 | 0 | 0 |
| 21 | 1000 ppm MPG, dry grinding | Dry | 0.2 | 2.6 | 1 | 74.6 |
| 22 | 2500 ppm MPG, dry grinding | Dry | 0.2 | 2.6 | 1 | 72.4 |
| 23 | 2500 ppm MPG, dry grinding | Dry | 0.1 | 1.7 | 1 | 71.3 |
| 24 | 2500 ppm MPG, dry grinding | Dry | 0.4 | 1.7 | 1 | 74.1 |
| 25 | 2500 ppm MPG, dry grinding | Dry | 0.8 | 1.7 | 1 | 73.6 |

MPG: Mono propylene glycol

PAANa: Sodium polyacrylate, Mw 6000 (±10%), polydispersity 2.6 (by GPC)

The invention claimed is:

1. A process for the preparation of a composition for beta-nucleation of polypropylene, comprising the following steps:
   (i) providing a particulate mineral solid support which comprises a compound of a IUPAC Group 2 metal,
   (ii) grinding the particulate mineral solid support in the presence of a dispersing and/or grinding agent so that the dispersing and/or grinding agent is adsorbed on its surface, and
   (iii) reacting the particulate mineral solid support, having a dispersing and/or grinding agent adsorbed on its surface, with a dicarboxylic acid having from 7 to 10 carbon atoms, wherein step (iii) is carried out during or after step (ii), so that a salt of the dicarboxylic acid forms on the surface of the particulate mineral solid support,
   wherein the compound of the IUPAC Group 2 metal is natural ground calcium carbonate, calcium-magnesium carbonate, or any mixture thereof; the natural calcium carbonate is marble, limestone, chalk or any mixture thereof; and the calcium-magnesium carbonate is dolomite, and
   wherein at least 80 mole % of the dicarboxylic acid is converted to the salt of the dicarboxylic acid.

2. The process according to claim 1, wherein step (ii) comprises at least one wet grinding step and/or at least one dry grinding step.

3. The process according to claim 1, wherein step (ii) comprises at least one wet grinding step and the dispersing and/or grinding agent is a homo- or copolymer of a carboxylic acid salt.

4. The process according to claim 1, wherein step (ii) comprises at least one dry grinding step and the dispersing and/or grinding agent is a glycol, a polyglycol, a polyalkylene glycol, a sugar, an alkanolamine, or any mixture thereof.

5. The process according to 1, wherein step (iii) is carried out during the grinding step (ii) by mixing the particulate mineral solid support with the dispersing and/or grinding agent and the dicarboxylic acid and subsequently subjecting the mixture to the grinding step (ii); or wherein step (iii) is carried out after the grinding step (ii) by mixing the particulate mineral solid support with the dispersing and/or grinding agent, followed by subjecting the mixture to the grinding step (ii), and subsequently reacting the ground particulate mineral solid support with the dicarboxylic acid.

6. The process according to claim 1, wherein the particulate mineral solid support comprises the compound of the IUPAC Group 2 metal in an amount of at least 50 wt %.

7. The process according to claim 1, wherein the particulate mineral solid support comprises the compound of the IUPAC Group 2 metal in an amount of at least 70 wt %.

8. The process according to claim 1, wherein the particulate mineral solid support comprises the compound of the IUPAC Group 2 metal in an amount of at least 90 wt %.

9. The process according to claim 1, wherein the particulate mineral solid support and/or the composition has/have a medium particle size $d_{50}$ of from 0.5 μm to 7 μm.

10. The process according to claim 1, wherein the particulate mineral solid support and/or the composition has/have a specific surface area of from 0.5 m$^2$/g to 15 m$^2$/g, measured using nitrogen and the BET method according to ISO 9277.

11. The process according to claim 1, wherein the salt of the dicarboxlic acid is a IUPAC Group 2 metal salt selected from a calcium salt, a magnesium salt, a strontium salt, or any mixture thereof.

12. The process according to claim 1, wherein the dicarboxylic acid is pimelic acid, suberic acid, azelaic acid, phthalic acid, isophthalic acid, terephthalic acid, or any mixture thereof.

13. The process according to claim 1, wherein the dicarboxylic acid is pimelic acid.

14. The process according to claim 1, wherein the salt of the dicarboxylic acid is present in an amount of 0.05 wt % to 10 wt %, based on the weight of the particulate mineral solid support.

15. The process according to claim 1, wherein the dispersing and/or grinding agent is present in an amount of 0.01 wt % to 2 wt %, based on the weight of the particulate mineral solid support.

16. The process according to claim 1, wherein the amount of the dicarboxylic acid salt, in mg, on the surface of the particulate mineral solid support, in m$^2$, is from 0.15 mg/m$^2$ to 30 mg/m$^2$.

* * * * *